(12) United States Patent
Yokoi

(10) Patent No.: US 11,267,466 B2
(45) Date of Patent: Mar. 8, 2022

(54) DRIVING SUPPORT DEVICE

(71) Applicant: TOYOTA JIDOSHA KABUSHIKI KAISHA, Toyota (JP)

(72) Inventor: Yasunobu Yokoi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 16/688,430

(22) Filed: Nov. 19, 2019

(65) Prior Publication Data

US 2020/0223432 A1  Jul. 16, 2020

(30) Foreign Application Priority Data

Jan. 16, 2019 (JP) .............................. JP2019-005451

(51) Int. Cl.
*B60W 30/095* (2012.01)
*B60W 40/04* (2006.01)

(52) U.S. Cl.
CPC ........ *B60W 30/0956* (2013.01); *B60W 40/04* (2013.01); *B60W 2554/80* (2020.02); *B60W 2556/65* (2020.02)

(58) Field of Classification Search
CPC ............. B60W 30/0956; B60W 40/04; B60W 2556/65; B60W 2554/80
USPC ......................................................... 701/301
See application file for complete search history.

(56) References Cited

U.S. PATENT DOCUMENTS

| | | | |
|---|---|---|---|
| 2012/0016581 A1* | 1/2012 | Mochizuki | ............. G08G 1/161 701/301 |
| 2017/0116850 A1* | 4/2017 | Kim | ................. G08G 1/096716 |
| 2017/0154531 A1 | 6/2017 | Funabashi | |
| 2017/0349168 A1* | 12/2017 | Meinhart | ................. B60T 7/22 |
| 2018/0188047 A1* | 7/2018 | Inoue | ................. G01C 21/3484 |

FOREIGN PATENT DOCUMENTS

| | | |
|---|---|---|
| JP | 2011-059946 A | 3/2011 |
| JP | 2011-113275 A | 6/2011 |
| JP | 2017-102520 A | 6/2017 |

\* cited by examiner

*Primary Examiner* — Thomas G Black
*Assistant Examiner* — Matthias S Weisfeld
(74) *Attorney, Agent, or Firm* — Sughrue Mion, PLLC

(57) ABSTRACT

A warning is not issued when there is not a history in which a host vehicle or an object vehicle (a recording target vehicle) have traveled from a current position of the host vehicle to a predicted collision point and a history in which the recording target vehicle has traveled from a current position of a collision-possible vehicle to the predicted collision point.

2 Claims, 5 Drawing Sheets

DRIVING SUPPORT DEVICE

INCORPORATION BY REFERENCE

The disclosure of Japanese Patent Application No. 2019-005451 filed on Jan. 16, 2019 including the specification, drawings and abstract is incorporated herein by reference in its entirety.

BACKGROUND

1. Technical Field

The present disclosure relates to a driving support device that gives a warning to a driver of a host vehicle when it is determined that there is a high likelihood that the host vehicle will collide with an object vehicle based on information which is received by vehicle-to-vehicle communication with the object vehicle.

2. Description of Related Art

Such a type of driving support device (hereinafter also referred to as a "device according to the related art") acquires a scheduled traveling route of an object vehicle (an object vehicle having a vehicle-to-vehicle communication function which is also referred to as a "communicative object vehicle" in the following description) based on information on a travel state of the object vehicle which is received by vehicle-to-vehicle communication (that is, radio communication between vehicles). The device according to the related art acquires a scheduled traveling route of the host vehicle. When the scheduled traveling route of the object vehicle and the scheduled traveling route of the host vehicle cross each other and a crossing point thereof (a predicted collision point) is located near a crossing in road map data, the device according to the related art determines that there is a high likelihood of collision with the object vehicle (for example, see Japanese Patent Application Publication No. 2017-102520 (JP 2017-102520 A)). The object vehicle which is determined to have a high likelihood of collision with the host vehicle is also referred to as a "collision-possible vehicle" in the following description.

SUMMARY

When at least one of a host vehicle and a collision-possible vehicle cannot reach a predicted collision point, collision between the host vehicle and the collision-possible vehicle does not occur. For example, when a host vehicle and a collision-possible vehicle are separated from each other by a medial divider, these vehicles do not collide with each other (see FIG. 3).

However, in the device according to the related art, it is not considered whether each of the host vehicle and a collision-possible vehicle can reach a predicted collision point. Accordingly, there is concern that a warning for collision with an object vehicle which a host vehicle cannot collide with is issued and thus a driver will feel discomfort.

Therefore, the present disclosure provides a driving support device that can accurately determine whether collision between a host vehicle and an object vehicle will occur based on information on the object vehicle acquired by vehicle-to-vehicle communication and decrease a frequency or a likelihood that a warning will be unnecessarily issued.

According to an aspect of the present disclosure, there is provided a driving support device (which is also referred to as a "device according to the present disclosure") including a host-vehicle scheduled route acquiring unit, an information receiving unit, an object-vehicle scheduled route acquiring unit, a warning unit, and a travelable condition determining unit.

The host-vehicle scheduled route acquiring unit (a driving support ECU 20) is configured to acquire a "host-vehicle scheduled route" which is a scheduled traveling route of a host vehicle (a vehicle 10) based on information on a position of the host vehicle and a travel state of the host vehicle.

The information receiving unit (a travel information receiving unit 37) is configured to receive information which is required for estimating an "object-vehicle scheduled route" which is a scheduled traveling route of an object vehicle from the object vehicle by radio communication.

The object-vehicle scheduled route acquiring unit (the driving support ECU 20) is configured to acquire the object-vehicle scheduled route based on the information received by the information receiving unit.

The warning unit (the driving support ECU 20) is configured to acquire a "route overlap point" which is an overlap point between points on the host-vehicle scheduled route and points on the object-vehicle scheduled route and to issue a warning to a driver of the host vehicle when it is determined that predetermined "warning conditions" including that there is an overlap point are satisfied (Step 530 in FIG. 5).

The travelable condition determining unit (the driving support ECU 20) is configured to determine whether "travelable conditions" that there is a vehicle which has traveled in a "first section" from a position of the host vehicle at a current time point to the route overlap point in the past and there is a vehicle which has traveled in a "second section" from a position at the current time point of the "object vehicle (collision-possible vehicle) corresponding to the object-vehicle scheduled route to the route overlap point" are satisfied, The warning unit is configured to determine that the warning conditions are not satisfied when the travelable condition determining unit determines that the travelable conditions are not satisfied (NO in Step 525 in FIG. 5).

A recording target vehicle may be the host vehicle or may be a plurality of vehicles including the host vehicle. Even when collision with an object vehicle (more specifically a collision-possible vehicle) at the route overlap point is predicted based on a host-vehicle scheduled route and an object-vehicle scheduled route, if at least one of the host vehicle and the collision-possible vehicle cannot reach the route overlap point, the collision does not occur. When the travelable conditions are not satisfied, there is a high likelihood that at least one of the host vehicle and the collision-possible vehicle cannot ¬ each the route overlap point. Accordingly, with the device according to the present disclosure, it is possible to accurately determine whether collision with a communicative object vehicle will occur and to issue a warning to a driver based on the result of determination. As a result, it is possible to decrease a frequency or a likelihood that a warning will be unnecessarily issued to a driver.

In the device according to an aspect of the present disclosure, the travelable condition determining unit may be configured to transmit a "travel record inquiry request" including information identifying the first section and information identifying the second section to a travel record server (50), to receive a "travel record response" to the travel record inquiry request from the travel record server, and to determine whether the travelable conditions are satisfied based on the received travel record response. The travel record response may be information which is generated based on a travel history of an arbitrary vehicle which is acquired from the arbitrary vehicle by the travel record server, and include information indicating whether there is a vehicle which has traveled in the first section in the past and information indicating whether there is a vehicle which has traveled in the second section in the past.

When a broad range of travel history information is stored as combined travel record information in the travel record server, the device according to the present disclosure can accurately determine whether both the host vehicle and the collision-possible vehicle can reach the route overlap point, even if the device does not store the travel record information. Accordingly, according to this aspect, it is possible to simplify the configuration of the device according to the present disclosure and to accurately determine whether collision with a communicative object vehicle will occur.

In the above description, for the purpose of easy understanding of a gist of the present disclosure, names and/or reference signs which are used in an embodiment which will be described later are added in parentheses to the elements of the present disclosure corresponding to the embodiment. However, the elements of the present disclosure are not limited to the embodiment which is defined by the names and/or reference signs. Other objectives, other features, and incidental advantages of the present disclosure will be easily understood from description of the embodiment of the present disclosure which will be described below with reference to the accompanying drawings.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
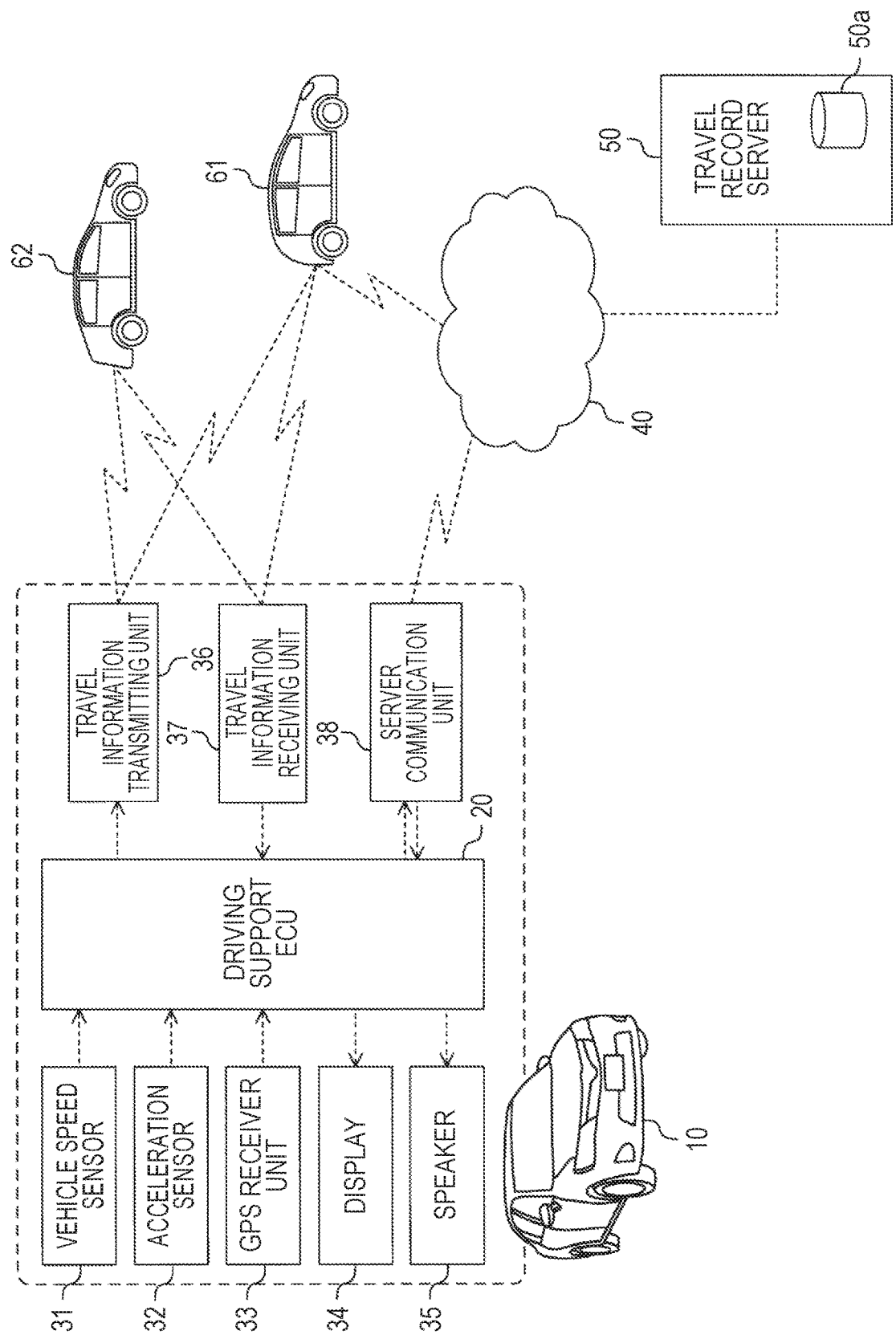
FIG. 1 is a diagram schematically illustrating a vehicle in which a driving support device according to an embodiment of the present disclosure (a present support device) is mounted and a travel record server.

Hereinafter, a driving support device according to an embodiment of the present disclosure (hereinafter also referred to as a "present support device") will be described with reference to the accompanying drawings. The present support device is applied to a vehicle 10 which is illustrated in FIG. 1. The present support device includes a driving support ECU 20 which is an electronic control unit (ECU).

The driving support ECU 20 includes a microcomputer including a CPU, a nonvolatile memory, and a RAM as a major component. The CPU performs data reading, numerical calculation, outputting of a calculation result, and the like by sequentially executing a predetermined program (routine). The nonvolatile memory is constituted by a flash memory and stores a program which is executed by the CPU and a lookup table (map) which is referred to at the time of execution of the program. The RAM temporarily stores data which is referred to by the CPU.

The driving support ECU 20 is connected to a vehicle speed sensor 31, an acceleration sensor 32, a GPS receiver unit 33, a display 34, a speaker 35, a travel information transmitting unit 36, a travel information receiving unit 37, and a server communication unit 38.

The vehicle speed sensor 31 detects a vehicle speed Vt which is a travel speed of the vehicle 10 and outputs a signal indicating the vehicle speed Vt to the driving support ECU 20. The acceleration sensor 32 detects a longitudinal acceleration As of the vehicle 10 and outputs a signal indicating the acceleration As to the driving support ECU 20.

The GPS receiver unit 33 acquires a current position Pn (such as latitude and longitude) of the vehicle 10 based on positioning signals received from positioning satellites (GPS satellites in this embodiment) and outputs a signal indicating the current position Pn to the driving support ECU 20. The driving support ECU 20 acquires a traveling direction Dr of the vehicle 10 based on change of the current position Pn with the elapse of time.

The display 34 is a liquid crystal display (LCD) that is disposed at a position which is visible to a driver (specifically in front of the driver) inside the vehicle 10. Characters, graphics, and the like which are displayed on the display 34 are controlled by the driving support ECU 20.

The speaker 35 is disposed inside the vehicle 10. Warning sounds, a voice message, and the like which are reproduced by the speaker 35 are controlled by the driving support ECU 20

The travel information transmitting unit 36 transmits "travel information" of the vehicle 10 to an object vehicle which is traveling near the vehicle 10 at intervals of a predetermined time by narrowband radio communication (DSRC in this embodiment). The travel information includes "a vehicle ID, a current position Pn which is expressed by a combination of latitude and longitude, a vehicle speed Vt, and a traveling direction Dr" of the vehicle 10.

The travel information receiving unit 37 receives travel information which is transmitted from an object vehicle which is traveling near the vehicle 10 by narrowband radio communication. That is, the vehicle 10 realizes vehicle-to-vehicle communication using the travel information transmitting unit 36 and the travel information receiving unit 37. The object vehicle which transmits travel information is also referred to as a "communicative object vehicle" for the purpose of convenience. Unique (that is, non-overlapping with other vehicles) vehicle IDs are given in advance to the vehicle 10 and the communicative object vehicle. The driving support ECU 20 stores the travel information received from the communicative object vehicle in the RAM until a predetermined time elapses after the travel information has been received.

The server communication unit 38 communicates with a travel record server 50 via a network 40. The network 40 is a known wide communication network including mobile communication (LTE in this embodiment) and the Internet. The server communication unit 38 transmits "travel record information" to the travel record server 50 at intervals of a predetermined time. The travel record information includes the vehicle ID of the vehicle 10 and the current position Pn which is expressed as a combination of latitude and longitude.

A vehicle (which includes the vehicle 10) that transmits travel record information to the travel record server 50 is also referred to as a "recording target object." There is a vehicle which is a communicative object vehicle and which is a recording target vehicle and there is also a vehicle which corresponds to one of a communicative object vehicle and a recording target vehicle. For example, a vehicle 61 illustrated in FIG. 1 is a communicative vehicle and is a recording target vehicle. On the other hand, a vehicle 62 is a communicative vehicle but is not a recording target vehicle.

The travel record server 50 includes a travel record database 50a. The travel record server 50 stores information on travel record information received from each recording target vehicle (which includes the vehicle 10) as "combined travel record information" in the travel record database 50a.

When a "travel record inquiry request" including a start point position Pa and an end point position Pe is received from the vehicle 10 and an object vehicle, the travel record server 50 transmits (returns) a "travel record response" to a transmission source of the travel record inquiry request. The travel record response includes a result of determination of whether a vehicle can travel on a route from the start point position Pa to the end point position Pe from the travel record server 50.

Specifically, since travel record information received from a certain recording target vehicle includes a vehicle ID of the vehicle, the travel record server 50 can acquire a traveling route (a travel history) of the vehicle by repeatedly receiving the travel record information from the vehicle. The combined travel record information stored in the travel record database 50a includes information on a travel history of each recording target vehicle.

When a travel record inquiry request is received and there is a recording target vehicle which has traveled continuously from the start point position Pa to the end point position Pe included in the travel record inquiry request in the past, the travel record server 50 determines that a vehicle can travel on a route from the start point position Pa and the end point position Pe. On the other hand, when there is no recording target vehicle which has traveled continuously from the start point position Pa to the end point position Pe included in the travel record inquiry request in the past, the travel record server 50 determines that a vehicle cannot travel on a route from the start point position Pa and the end point position Pe.

The travel record server 50 returns a travel record response including the result of determination of whether a vehicle can travel from the start point position Pa to the end point position Pe.

(Collision Warning Process)

The driving support ECU 20 determines whether there is a high likelihood that the vehicle 10 will collide with an object vehicle (specifically a communicative object vehicle) and issues a warning to (calls attention of) a driver via the display 34 and the speaker 35 when it is determined that there is a high likelihood that the vehicle 10 will collide with the object vehicle. This series of processes is also referred to as a "collision warning process."

More specifically, the driving support ECU 20 acquires a "host-vehicle scheduled route" which is a scheduled traveling route of the vehicle 10 in a "predicted period" based on the "vehicle speed Vt, the acceleration As, and the traveling direction Dr" of the vehicle 10 using a known method. The predicted period is a period with a current time point as a start point and with a time point a predetermined predicted time Tp from the current time point as an end point.

The driving support ECU 20 acquires an "object-vehicle scheduled route" which is a scheduled traveling route of a communicative object vehicle in the predicted period based on travel information received from the communicative object vehicle using a known method. When there is a plurality of communicative object vehicles, the driving support ECU 20 acquires the object-vehicle scheduled route for each vehicle ID of the communicative object vehicles included in the travel information (that is, for each communicative object vehicle).

When there is an overlap point between points on the host-vehicle scheduled route and points on the object-vehicle scheduled route (that is, when the host-vehicle scheduled route and the object-vehicle scheduled route cross each other or when one end of one of the host-vehicle scheduled route and the object-vehicle scheduled route is located on the other route), the driving support ECU 20 handles the communicative object vehicle corresponding to the object-vehicle scheduled route as a "collision-possible vehicle." The overlap point (point) between the host-vehicle scheduled route and the object-vehicle scheduled route is also referred to as a "route overlap point" for the purpose of convenience.

When a collision-possible vehicle is detected out of communicative object vehicles from which the vehicle 10 can receive travel information, the driving support ECU 20 performs a "reachability determining process" on the route overlap point. The reachability determining process is a process of determining whether both the vehicle 10 and the collision-possible vehicle can reach the route overlap point.

More specifically, the driving support ECU 20 transmits a travel record inquiry request (a host vehicle inquiry request) with the current position Pn of the vehicle 10 as a start point position Pa and with the route overlap point as an end point position Pe to the travel record server 50. A section from the current position Pn of the vehicle 10 to the route overlap point is also referred to as a "first section" for the purpose of convenience. The driving support ECU 20 transmits a travel record inquiry request (an object vehicle inquiry request) with the current position of the collision-possible vehicle as a start point position Pa and with the route overlap point as an end point position Pe to the travel record server 50. A section from the current position of the collision-possible vehicle to the route overlap point is also referred to as a "second section" for the purpose of convenience. The host vehicle inquiry request and the object vehicle inquiry request are also generically referred to as "travel record inquiry requests" for the purpose of convenience.

Thereafter, the driving support ECU 20 receives a travel record response to the host vehicle inquiry request and a travel record response to the object vehicle inquiry request. Then, the driving support ECU 20 determines whether the travel record response to the host vehicle inquiry request indicates that the vehicle 10 can reach the route overlap point and whether the travel record response to the object vehicle inquiry request indicates that the collision-possible vehicle can reach the route overlap point. A series of processes until this determination is performed is the reachability determining process routine.

When the travel record response to the host vehicle inquiry request indicates that the vehicle 10 can reach the route overlap point and the travel record response to the object vehicle inquiry request indicates that the collision-possible vehicle can reach the route overlap point, the driving support ECU 20 determines that both the vehicle 10 and the collision-possible vehicle can reach the route overlap point. In this case, the driving support ECU 20 issues a warning to the driver and calls the driver's attention.

On the other hand, when the travel record response to the host vehicle inquiry request and the travel record response to the object vehicle inquiry request indicate that at least one of the vehicle 10 and the collision-possible vehicle cannot reach the route overlap point, the driving support ECU 20 does not issue a warning to the driver. The process routine which has been described up to now is the collision warning process routine.

Conditions which are satisfied when it is determined that both the vehicle 10 and the collision-possible vehicle can reach the route overlap point through the reachability determining process routine are also referred to as "travelable conditions" for the purpose of convenience. In this embodiment, the travelable conditions are satisfied when information on a recording target vehicle which has traveled over the first section and information on a recording target vehicle which has traveled over the second section are stored as combined travel record information in the travel record database 50a.

Figure 2:
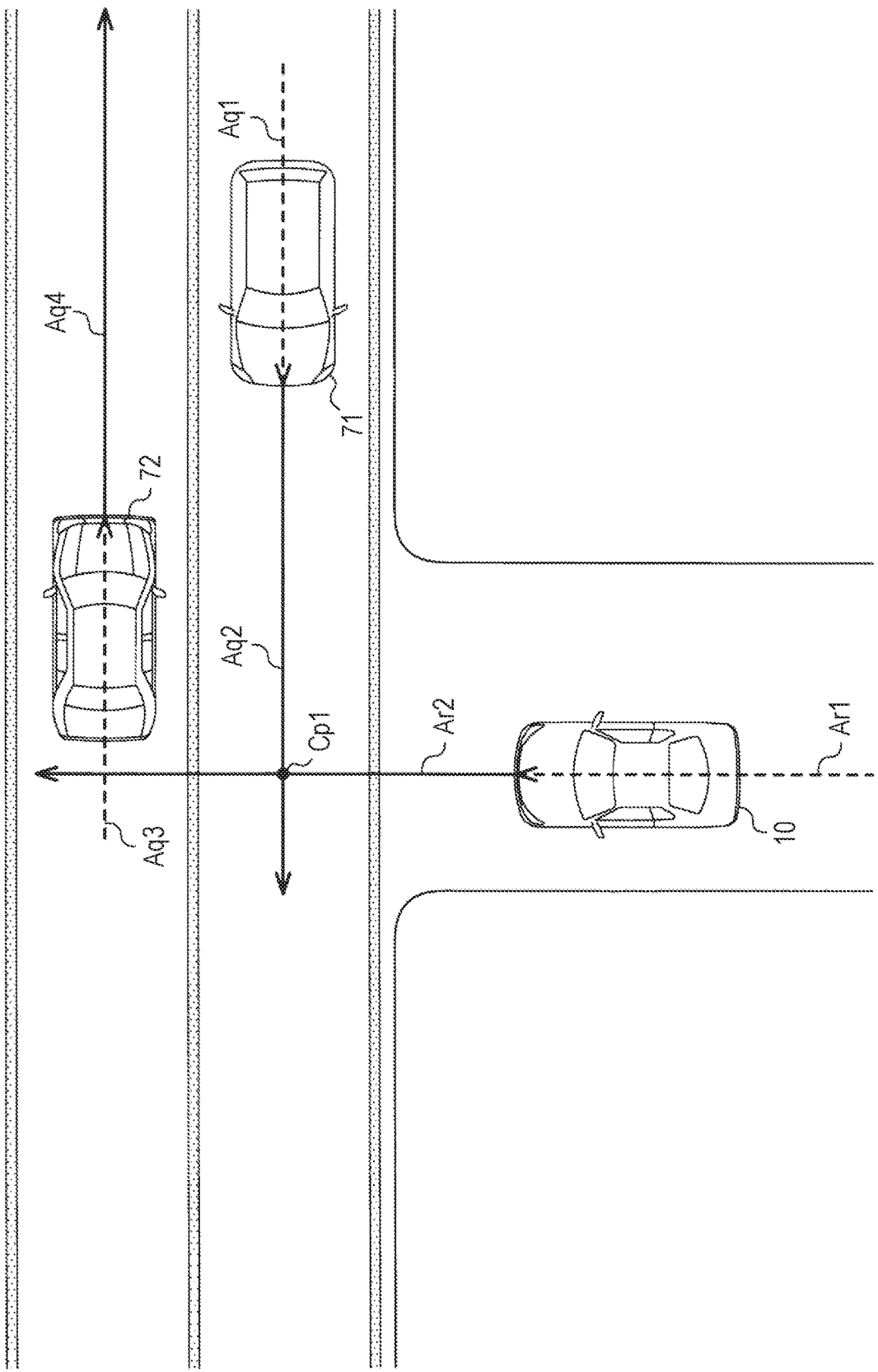
FIG. 2 is a diagram illustrating an example in which a warning is issued by the present support device.

An example in which a warning is issued to a driver through the collision warning process routine is illustrated in FIG. 2. In FIG. 2, a vehicle 71 and a vehicle 72 are communicative object vehicles. A dotted arrow Ar1 denotes a traveling path of the vehicle 10 (a moving path of a front lateral center part of the vehicle 10). An arrow Ar2 denotes a host-vehicle scheduled route of the vehicle 10.

A dotted arrow Aq1 denotes a traveling path of the vehicle 71 (a moving path of a front lateral center part of the vehicle 71). An arrow Aq2 denotes an object-vehicle scheduled route of the vehicle 71. A point Cp1 denotes a route overlap point between the vehicle 10 and the vehicle 71. A dotted arrow Aq3 denotes a traveling path of the vehicle 72 (a moving path of a front lateral center part of the vehicle 72). An arrow Aq4 denotes an object-vehicle scheduled route of the vehicle 72.

Since there is the point Cp1 which is a route overlap point, the vehicle 71 is a collision-possible vehicle. On the other hand, since points on the arrow Ar2 and points on the arrow Aq4 do not overlap each other, the vehicle 72 is not a collision-possible vehicle. Accordingly, in this case, the driving support ECU 20 performs the reachability determining process on the vehicle 71.

More specifically, the driving support ECU 20 transmits a travel record inquiry request (a host vehicle inquiry request) with a start point of the arrow Ar2 as a start point position Pa and with the point Cp1 as an end point position Pe to the travel record server 50. The driving support ECU 20 transmits a travel record inquiry request (an object vehicle inquiry request) with a start point of the arrow Aq2 as a start point position Pa and with the point Cp1 as an end point position Pe to the travel record server 50.

In this example, a travel record response to the host vehicle inquiry request indicates that the vehicle can travel from the start point position Pa (the start point of the arrow Ar2) to the end point position Pe (the point Cp1). A travel record response to the object vehicle inquiry request indicates that the vehicle can travel from the start point position Pa (the start point of the arrow Aq2) to the end point position Pe (the point Cp1).

Accordingly, the driving support ECU 20 determines that both the vehicle 10 and the vehicle 71 (the collision-possible vehicle) can reach the route overlap point (the point Cp1) through the reachability determining process routine. As a result, the driving support ECU 20 issues a warning to the driver of the vehicle 10 to call attention to the vehicle 71.

Figure 3:
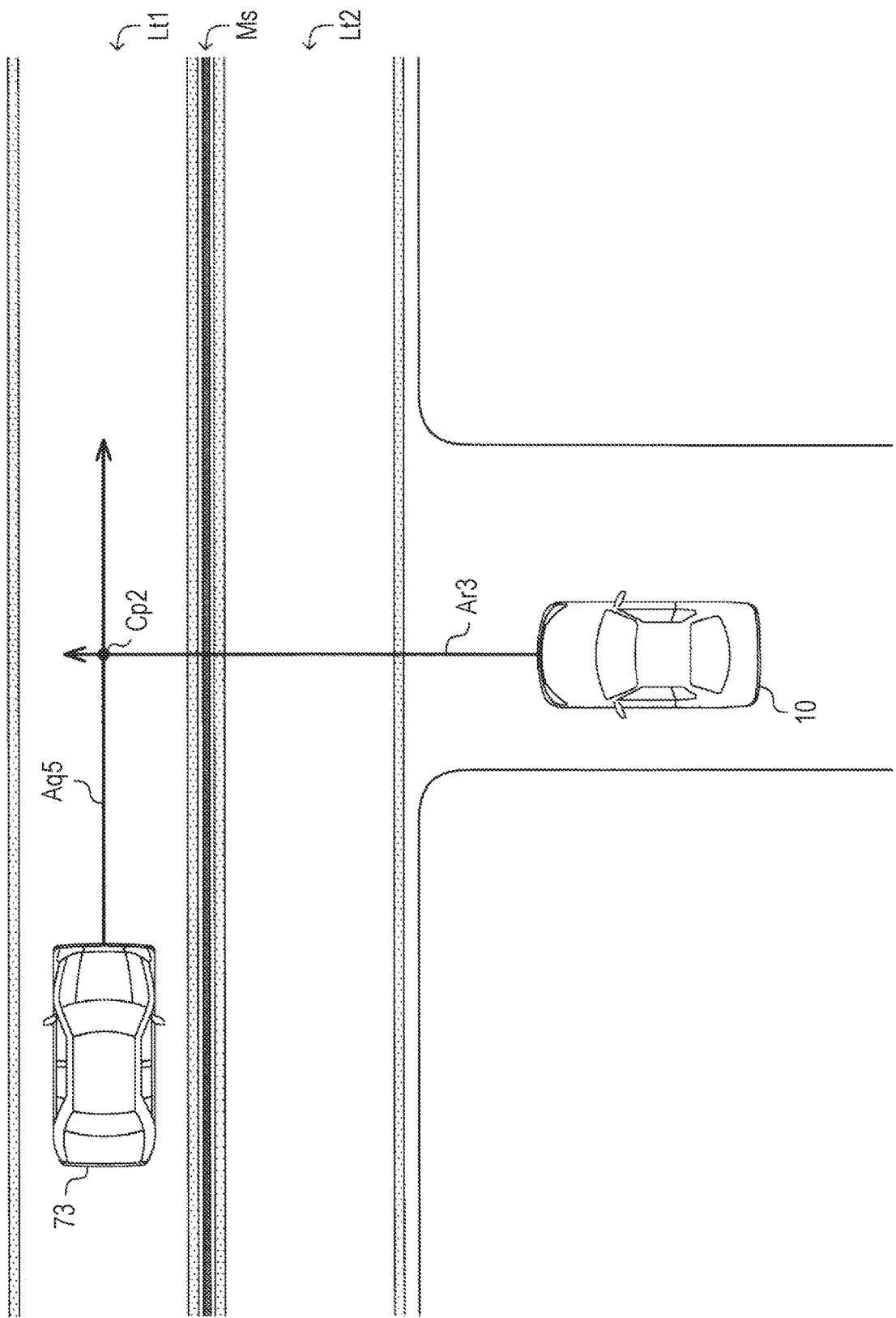
FIG. 3 is a diagram illustrating an example in which a warning is not issued by the present support device.

An example in which a warning is not issued to a driver through the collision warning process routine is illustrated in FIG. 3. In FIG. 3, a vehicle 73 is a communicative object vehicle. An arrow Ar3 denotes a host-vehicle scheduled route of the vehicle 10. An arrow Aq5 denotes an object-vehicle scheduled route of the vehicle 73. A point Cp2 denotes a route overlap point between the vehicle 10 and the vehicle 73. In FIG. 3, a medial divider Ms blocks traveling of a vehicle between a lane Lt1 on which the vehicle 73 is traveling and a lane Lt2 which is the opposite lane of the lane Lt1.

In this case, the driving support ECU 20 performs the reachability determining process routine on the vehicle 73 which is a collision-possible vehicle. That is, the driving support ECU 20 transmits a travel record inquiry request (a host vehicle inquiry request) with a start point of the arrow Ar3 as a start point position Pa and with the point Cp2 as an end point position Pe to the travel record server 50. The driving support ECU 20 transmits a travel record inquiry request (an object vehicle inquiry request) with a start point of the arrow Aq5 as a start point position Pa and with the point Cp2 as an end point position Pe to the travel record server 50.

In this example, a travel record response to the host vehicle inquiry request indicates that the vehicle cannot travel from the start point position Pa (the start point of the arrow Ar3) to the end point position Pe (the point Cp2). On the other hand, a travel record response to the object vehicle inquiry request indicates that the vehicle can travel from the start point position Pa (the start point of the arrow Aq5) to the end point position Pe (the point Cp2).

Accordingly, the driving support ECU 20 determines that the vehicle 10 cannot reach the route overlap point (the point Cp2) through the reachability determining process routine. That is, the driving support ECU 20 determines that the likelihood of collision between the vehicle 10 and the vehicle 73 is not high. As a result, the driving support ECU 20 does not issue a warning to the driver.

Figure 4:
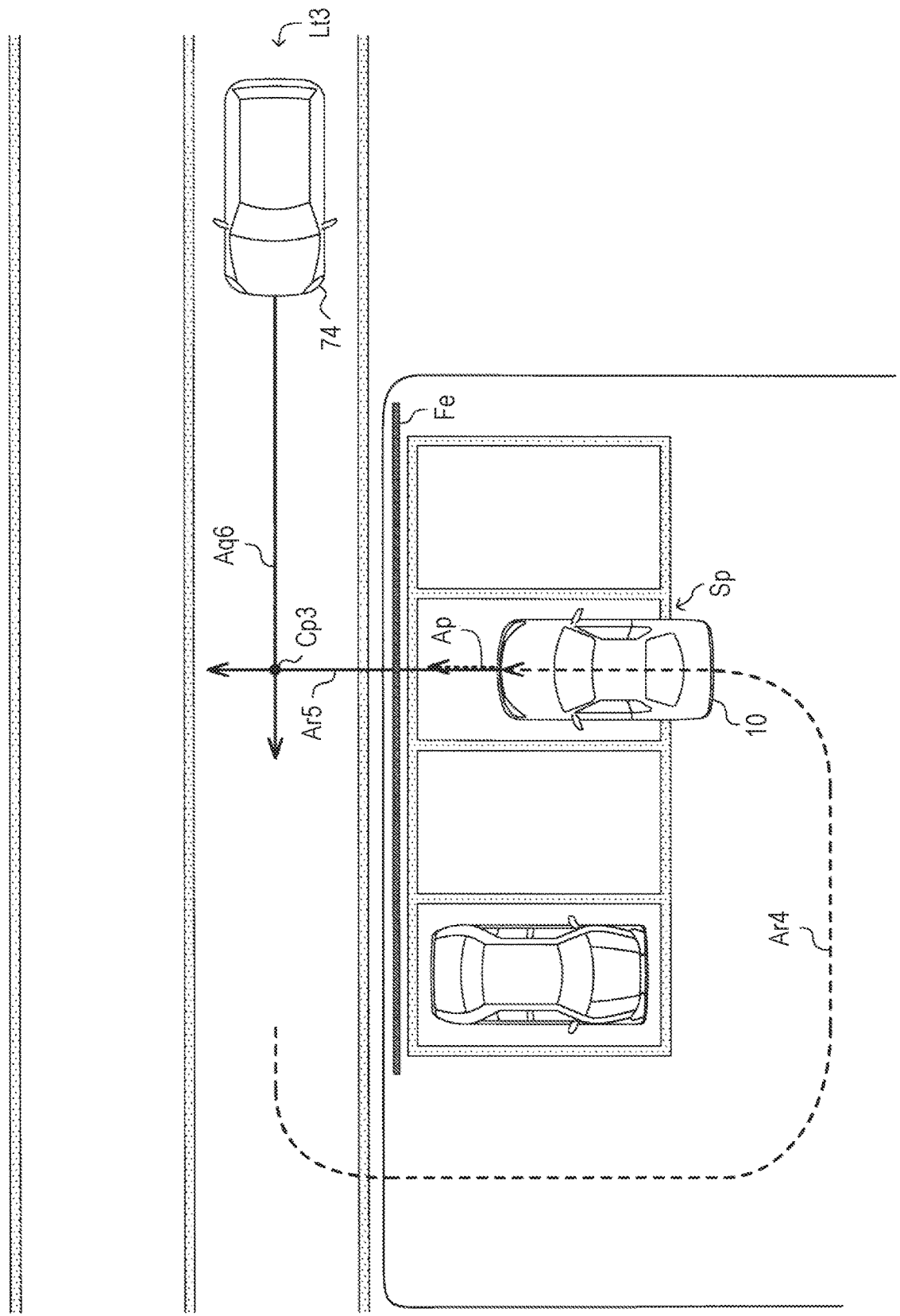
FIG. 4 is a diagram illustrating another example in which a warning is not issued by the present support device.

Another example in which a warning is not issued to a driver through the collision warning process routine is illustrated in FIG. 4. In FIG. 4, a vehicle 74 is a communicative object vehicle. A dotted arrow Ar4 denotes a traveling path of the vehicle 10. An arrow Ar5 denotes a host-vehicle scheduled route of the vehicle 10. An arrow Aq6 denotes an object-vehicle scheduled route of the vehicle 74. A point Cp3 denotes a route overlap point between the vehicle 10 and the vehicle 74.

As can be understood from FIG. 4 (particularly, the dotted arrow Ar4), the vehicle 10 intends to turn to left from a lane Lt3 (that is, a lane on which the vehicle 74 is traveling), to enter an area of a parking lot, and to enter a parking position Sp from front for parking. A fence Fe is installed between the parking lot and the lane Lt3.

In this case, the driving support ECU 20 performs the reachability determining process routine on the vehicle 74 which is a collision-possible vehicle. That is, the driving support ECU 20 transmits a travel record inquiry request (a host vehicle inquiry request) with a start point of the arrow Ar5 as a start point position Pa and with the point Cp3 as an end point position Pe to the travel record server 50. The driving support ECU 20 transmits a travel record inquiry request (an object vehicle inquiry request) with a start point of the arrow Aq6 as a start point position Pa and with the point Cp3 as an end point position Pe to the travel record server 50.

In this example, a travel record response to the host vehicle inquiry request indicates that the vehicle cannot travel from the start point position Pa (the start point of the arrow Ar5) to the end point position Pe (the point Cp3). On the other hand, a travel record response to the object vehicle inquiry request indicates that a vehicle can travel from the start point position Pa (the start point of the arrow Aq6) to the end point position Pe (the point Cp3).

Accordingly, the driving support ECU 20 determines that the vehicle 10 cannot reach the route overlap point (the point Cp3) through the reachability determining process routine, and does not issue a warning to the driver.

It is assumed that the driving support ECU 20 transmits a travel record inquiry request with a start point of an arrow Ap illustrated in FIG. 4 as a start point position Pa and with an end point of the arrow Ap as an end point position Pe to the travel record server 50. In this case, there is a likelihood that the travel record server 50 will return a travel record response indicating that a vehicle can travel from the start point position Pa (the start point of the arrow Ap) to the end point position Pe (the end point of the arrow Ap).

More specifically, when there is a recording target vehicle which entered the parking position Sp from front and was parked therein in the past, the travel record server 50 determines that a vehicle can travel from the start point position Pa (the start point of the arrow Ap) to the end point position Pe (the end point of the arrow Ap).

(Specific Operation of Collision Warning Process)

The specific operation of the driving support ECU 20 will be described below with reference to FIG. 5. The CPU of the driving support ECU 20 (hereinafter simply referred to as a "CPU") performs a "collision warning process routine" illustrated in the flowchart of FIG. 5 whenever a predetermined time elapses.

Figure 5:
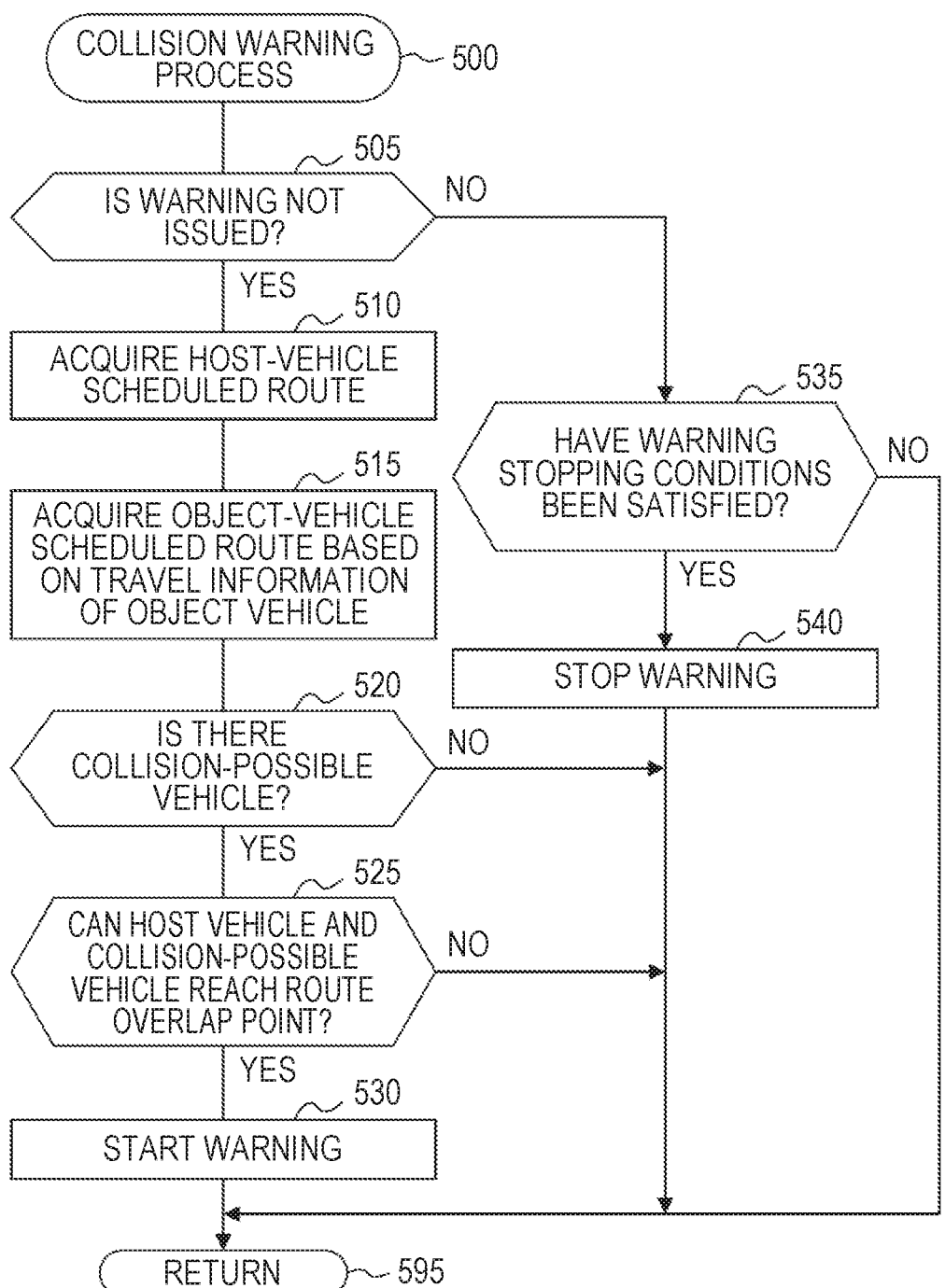
FIG. 5 is a flowchart illustrating a collision warning process routine which is performed by the present support device.

Accordingly, at an appropriate timing, the CPU starts the process routine from Step 500 in FIG. 5 and determines whether a warning has not been issued through the collision warning process (that is, whether attention of a driver continues to be called using the display 34 and the speaker 35) in Step 505.

When a warning has not been issued through the collision warning process, the CPU determines "YES" in Step 505 and acquires a host-vehicle scheduled route in Step 510. Subsequently, in Step 515, the CPU estimates (acquires) an object-vehicle scheduled route based on travel information received from a communicative object vehicle by the travel information receiving unit 37. When there is a plurality of communicative object vehicles, the CPU estimates (acquires) an object-vehicle scheduled route for each of the communicative object vehicles. In Step 520, the CPU determines whether there is a collision-possible vehicle based on the host-vehicle scheduled route and the object-vehicle scheduled route.

When there is a collision-possible vehicle, the CPU determines "YES" in Step 520, and performs a reachability determining process on a route overlap point associated with the collision-possible vehicle in Step 525 to determine whether both the vehicle 10 and the collision-possible vehicle can reach the route overlap point. That is, the CPU transmits a host vehicle inquiry request and an object vehicle inquiry request to the travel record server 50 and determines whether both the vehicle 10 and the collision-possible vehicle can reach the route overlap point based on travel record responses to the requests.

When both the vehicle 10 and the collision-possible vehicle can reach the route overlap point, the CPU determines "YES" in Step 525 and starts warning for a driver in Step 530. Subsequently, the CPU temporarily ends this routine in Step 595.

Thereafter, when this routine is restarted, warning for a driver has been started and thus the CPU determines "NO" in Step 505 and determines whether warning stopping conditions are satisfied in Step 535. In this embodiment, the warning stopping conditions are conditions which are satisfied when a predetermined time elapses after warning has been started through the process of Step 530.

When the warning stopping conditions are not satisfied, the CPU determines "NO" in Step 535 and directly performs Step 595.

On the other hand, when the warning stopping conditions are satisfied, the CPU determines "YES" in Step 535, and stops warning (calling of attention using the display 34 and the speaker 35) in Step 540. Subsequently, the CPU performs Step 595.

When the determination conditions of Step 520 are not satisfied (that is, when there is no collision-possible vehicle), the CPU determines "NO" in Step 520 and directly performs Step 595. When the determination conditions of Step 525 are not satisfied (that is, when at least one of the vehicle 10 and the collision-possible vehicle cannot reach the route overlap point), the CPU determines "NO" in Step 525 and directly performs Step 595.

As described above, the driving support ECU 20 does not issue a warning to the driver, when a collision-possible vehicle is detected (extracted) out of the communicative object vehicles but it is determined that the travelable conditions are not satisfied through the reachability determining process. That is, with the present support device, it is possible to more accurately determine whether collision between the vehicle 10 and a communicative object vehicle is to occur and to issue a warning to a driver based on the result of determination. As a result, since a warning associated with collision with a communicative object vehicle with which collision will not occur is not issued, it is possible to curb a driver's feeling discomfort due to unnecessary warning.

While a driving support device according to an embodiment of the present disclosure has been described above, an applicable embodiment of the present disclosure is not limited to the embodiment and can be modified in various forms without departing from the gist of the present disclosure. For example, the driving support ECU 20 in this embodiment transmits a travel record inquiry request (a host vehicle inquiry request) associated with a first section and a travel record inquiry request (an object vehicle inquiry request) associated with a second section to the travel record server 50 at the time of performing the reachability determining process. However, the driving support ECU 20 and the travel record server 50 may be configured such that the driving support ECU 20 transmits "one travel record inquiry request associated with both the first section and the second section" to the travel record server 50 at the time of performing the reachability determining process.

More specifically, the driving support ECU 20 may be configured to transmit a "travel record inquiry request including a current position of the vehicle 10, a current position of a collision-possible vehicle, and a route overlap point" to the travel record server 50 at the time of performing the reachability determining process. In this case, the travel record server 50 determines "whether both the vehicle 10 and the collision-possible vehicle can reach the route overlap point" based on the combined travel record information and transmits the result of determination as a travel record response to the driving support ECU 20. When the result of determination included in the travel record response indicates that "both the vehicle 10 and the collision-possible vehicle can reach the route overlap point," the driving support ECU 20 determines that the travelable conditions are satisfied.

The driving support ECU 20 in this embodiment performs the reachability determining process to determine whether the travelable conditions are satisfied by transmitting the travel record inquiry request to the travel record server 50. However, the reachability determining process may be a process which is different therefrom. For example, the driving support ECU 20 may store a travel history of the vehicle 10 and determine that the travelable conditions are satisfied when there is a travel history indicating that the vehicle 10 has traveled over both the first section and the second section in the past.

Alternatively, the driving support ECU 20 may be configured to periodically acquire combined travel record information stored in the travel record database 50*a* in a bundle and to store the acquired combined travel record information in the nonvolatile memory of the driving support ECU 20. Inputting of the combined travel record information to the driving support ECU 20 may be performed using a USB memory instead of radio communication. In this case, the driving support ECU 20 determines whether the travelable conditions are satisfied with reference to the combined travel record information stored in the driving support ECU 20 at the time of performing the reachability determining process.

In this embodiment, a recording target vehicle periodically transmits travel record information at the current time point to the travel record server 50. However, a recording target vehicle may transmit integrated travel record information to the travel record server 50. For example, a recording target vehicle may transmit routes on which the recording target vehicle has traveled for last 24 hours to the travel record server 50 in a bundle every day.

The driving support ECU 20 in this embodiment receives travel information directly from a communicative object vehicle. However, the driving support ECU 20 may receive travel information which is transmitted from a communicative object vehicle via a relay installed in a traffic signal, a utility pole, or the like.

In this embodiment, the driving support ECU 20 acquires (estimates) an object-vehicle scheduled route based on the travel information received from a communicative object vehicle. However, the driving support ECU 20 may be configured to acquire (receive) the object-vehicle scheduled route acquired (estimated) by a communicative object vehicle via the travel information receiving unit 37.

In this embodiment, the travel record server 50 determines that a vehicle can travel over a route from a start point position Pa to an end point position Pe when a travel record inquiry request has been received and there is a recording target vehicle which has traveled continuously from the start point position Pa to the end point position Pe which is included in the travel record inquiry request in the past. However, determination of whether a vehicle can travel may be performed by the travel record server 50 using another method. For example, when a recording target vehicle moves from the start point position Pa to the end point position Pe in a predetermined time (for example, several tens of seconds), the travel record server 50 may determine that a vehicle can travel over the route from the start point position Pa to the end point position Pe. Alternatively, when a recording target vehicle has traveled over a section form the start point position Pa to an "intermediate position between the start point position Pa and the end point position Pe" in the past and another recording target vehicle has traveled over a section from the intermediate position to the end point position Pe in the past, the travel record server 50 may determine that a vehicle can travel over a route from the start point position Pa to the end point position Pe.

In this embodiment, the travel information transmitting unit 36 and the travel information receiving unit 37 communicate with a communicative object vehicle by the DSRC (that is, transmits and receives travel information). However, a radio communication protocol other than the DSRC may be used for communication with a communicative object vehicle. For example, the travel information transmitting unit 36 and the travel information receiving unit 37 may communicate with a communicative object vehicle by a 5th generation mobile communication system (5G).

The driving support ECU 20 may include a map database and acquire a host-vehicle scheduled route and an object-vehicle scheduled route with reference to the map database. Alternatively, the driving support ECU 20 may acquire a host-vehicle scheduled route and an object-vehicle scheduled route in consideration of a yaw rate of the vehicle 10 and a turning radius of a communicative object vehicle.

What is claimed is:

1. A driving support device comprising:
   an electronic control unit (ECU) including a processor programmed to:
   acquire a host-vehicle scheduled route which is a scheduled traveling route of a host vehicle based on information on a position of the host vehicle and a travel state of the host vehicle;
   receive information which is required for estimating an object-vehicle scheduled route which is a scheduled traveling route of an object vehicle from the object vehicle by radio communication;
   acquire the object-vehicle scheduled route based on the information received;
   acquire a route overlap point which is an overlap point between points on the host-vehicle scheduled route and points on the object-vehicle scheduled route;
   determine whether predetermined warning conditions including that there is the overlap point are satisfied; and
   after the determination that the predetermined warning conditions are satisfied, determine whether travelable conditions are satisfied, the travelable conditions including: (i) that a vehicle has previously traveled through a first section, which is from a current position of the host vehicle at a current time point to the route overlap point, and (ii) that a vehicle has previously traveled through a second section, which is from a current position of the object-vehicle at the current time point to the route overlap point,
   based upon a determination that the travelable conditions are satisfied, issue a warning to a driver of the host vehicle, and
   based upon a determination that the travelable conditions are not satisfied, not issue a warning to the driver of the host vehicle.

2. The driving support device according to claim 1, wherein the ECU is further programmed to transmit a travel record inquiry request including information identifying the first section and information identifying the second section to a travel record server, to receive a travel record response to the travel record inquiry request from the travel record server, and to determine whether the travelable conditions are satisfied based on the received travel record response, and
   wherein the travel record response is information which is generated based on a travel history of an arbitrary vehicle which is acquired from the arbitrary vehicle by the travel record server and includes information indicating whether there is a vehicle which has traveled in the first section in the past and information indicating whether there is a vehicle which has traveled in the second section in the past.

\* \* \* \* \*